Dec. 11, 1956 R. B. MATTHEWS ET AL 2,774,016
ELECTROMAGNETIC CONTROL DEVICE
Filed Aug. 26, 1952 2 Sheets-Sheet 1

INVENTORS:
Russell B. Matthews
John H. Thornbery
By:
Attys.

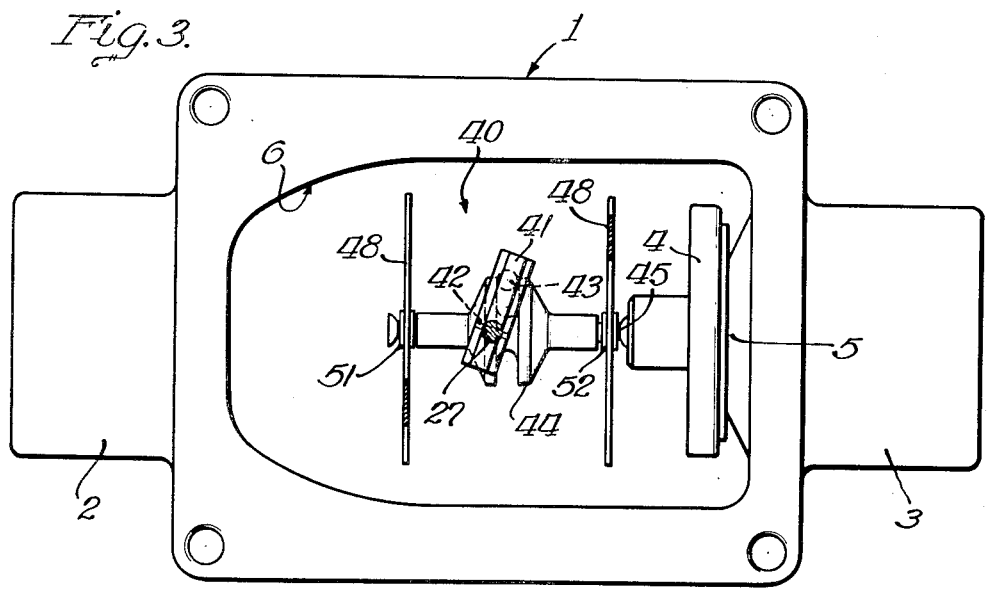
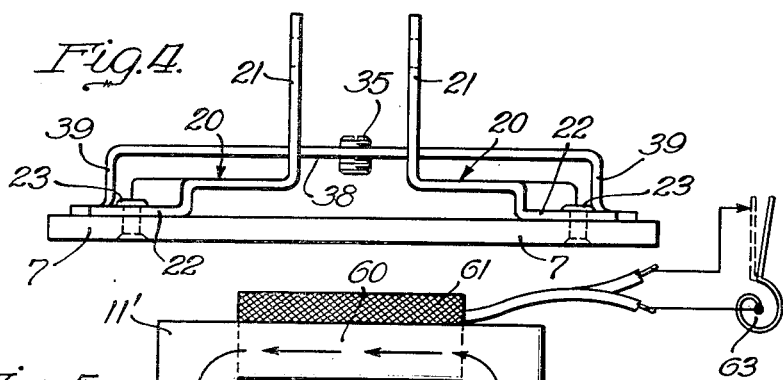
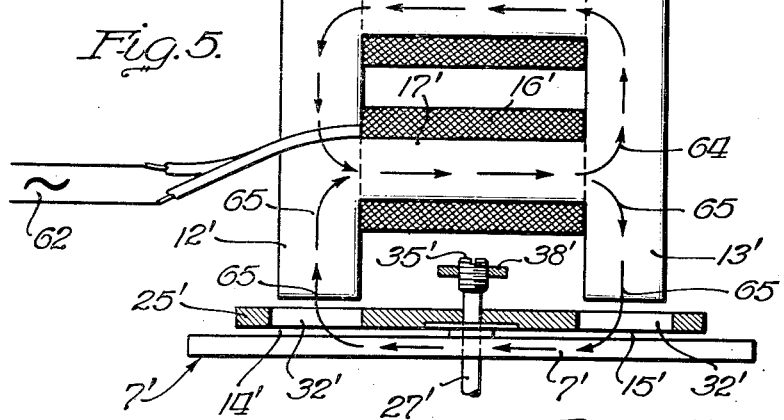

United States Patent Office 2,774,016
Patented Dec. 11, 1956

2,774,016

ELECTROMAGNETIC CONTROL DEVICE

Russell B. Matthews, Wauwatosa, and John H. Thornbery, Whitefish Bay, Wis., assignors to Milwaukee Gas Specialty Company, Milwaukee, Wis., a corporation of Wisconsin Application August 26, 1952, Serial No. 306,444

8 Claims. (Cl. 317—167)

This invention relates, in general, to control devices, and more particularly, to electromagnetic operators having particular utility in the operation of valves or the like of novel construction and novel coaction for controlling the flow of fluids therethrough.

While we have shown and shall describe herein the electromagnetic operator of the present invention as applied for operating a valve, it is to be understood that it is not in its broader aspects limited to such use but may be employed for all similar purposes, for example, for operating a switch or other desired device.

In the provision of apparatus of the character to which the present invention relates, certain basic considerations must be kept in mind. First, where, for example, the apparatus is for controlling the flow of fluid fuel to a main burner of fluid fuel burning apparatus, the valve must have sufficient capacity to be usable for this purpose. The capacity of a valve, it has been found, is for all practical purposes a function of the product of size or diameter of the valve and the distance which the valve member is removed from the valve seat when the valve is opened, such movement usually being against the sealing force of the valve member which, in turn, must be sufficient to prevent leakage of the valve when closed. It follows, therefore, that a given amount of work must be done to open a valve of given capacity and that the amount of force provided by the operator must be sufficient to do such work.

Accordingly, one of the main objects of the present invention is to provide an improved form of electromagnetic operator which will provide sufficient force for operating, for example, a valve for controlling the flow of fuel to a main burner and which electromagnetic operator is capable of moving such a valve against a sealing force sufficient to prevent leakage of the valve when closed.

Another object of the invention is to provide a compact and highly efficient operator which lends itself to simple and economical fabrication, is silent in operation, and affords maximum operating force or torque at the start of the operator movement as distinguished from devices in which the force exerted initially is a minimum. This is advantageous in that it provides a large initial or starting force for overcoming the inertia and friction of the moving parts and a strong initial force which, for example, will overcome fluid pressures in "cracking" or opening a valve wherein the controlled fluid, such as gas for a gas heater, usually tends to hold the valve closed.

Another object is to provide an improved form of electromagnetic operator wherein there is at least one and preferably a pair of magnetic air gaps which are never completely closed, and which air gaps remain constant throughout the life of the device as distinguished from electromagnetic devices wherein a magnetic part is attracted to and sealed against an electromagnet when energized or in which non-magnetic spacers are utilized in an attempt to maintain an air gap. The present device thereby eliminates any sticking or magnetic "hang up" of the actuated member and any differential in the "pick up" and "drop out" of the device as, for example, due to residual magnetism. The electromagnetic operator of the present invention not only affords the necessary power for operating the valve or other member to be actuated but has great sensitivity and is quick in response.

Another object is to provide an improved electromagnetic operating means for translation of electric energy to rotary mechanical movement and for actuating the device to be operated by such rotary movement.

Another object is to provide an improved form of device which may have, combined in one unit if desired, an electromagnetic operator and a transformer including a magnetic frame and primary and secondary windings for establishing magnetic flux in said frame and diverting the magnetic flux across the one or more air gaps which transformer constitutes a current limiting stepdown transformer wherein the electric energy produced in the secondary winding may be relatively low and substantially constant so that the secondary circuit and a thermostat or other condition responsive means therefor will not be deleteriously affected by the energizing current supplied to the primary winding and so that the type of insulating conduits required for line voltage conductors are unnecessary. The device is immune to short circuits on the secondary side of the transformer from the standpoint of damage due to overheating.

Another advantage of the device of the present application is that stand-by power loss is low; that is, there is relatively low power consumption when the secondary circuit is not energized. This stand-by loss compares favorably with a conventional current limiting transformer.

Another object is to provide biasing means for biasing the armature in a direction opposite to the direction in which it is moved by magnetic flux across the air gaps and which biasing means is effective when no flux is present in the air gaps to move the actuated member to one of its positions and to position the armature where it will be acted upon by magnetic flux across the air gaps to move the actuated member to its other position.

Another object is to provide an improved form of device of the herein mentioned character in which the force afforded by the armature portions for a pair of air gaps is additive thereby affording increased force for the operator for a given value of flux density.

Another object is to provide in a device of the character set forth an armature in the form of a flat stamping mounted for turning movement about an axis disposed generally parallel with the direction of spacing of the magnetic frame portions between which the air gaps are formed, and more particularly such an armature having coplanar circuit conducting paths of closed looped form through which current induced by energization of the winding is adapted to flow for reaction with the magnetic flux across the air gaps to impart turning movement to the armature.

Another object is to provide in a device of the type set forth and with an armature of the aforementioned character a magnetic frame of inverted generally U-shaped configuration with the ends of the legs of the magnetic frame affording pole faces presented toward and spaced from a magnetic base plate to provide a pair of coplanar magnetic air gaps and wherein the winding is disposed on a leg of the magnetic frame which magnetically connects the legs affording the pole faces and is located to one side of the plane of the air gaps.

Further objects and advantages and numerous adaptations of the invention will appear from the following detailed description taken in connection with the accompanying drawings, it being understood that the invention is limited only within the scope of the appended claims and not to the particular embodiments selected for illustration.

In the drawings:

Figure 3 is a sectional view taken on the line 3—3 of Figure 1;

Figure 4 is a view of the brackets for supporting the magnetic frame of the operator and the upper bearing insert for the armature shaft; and Figure 5 is a fragmentary axial sectional view of a transformer type of electromagnetic operator embodying the present invention.

Figure 1:
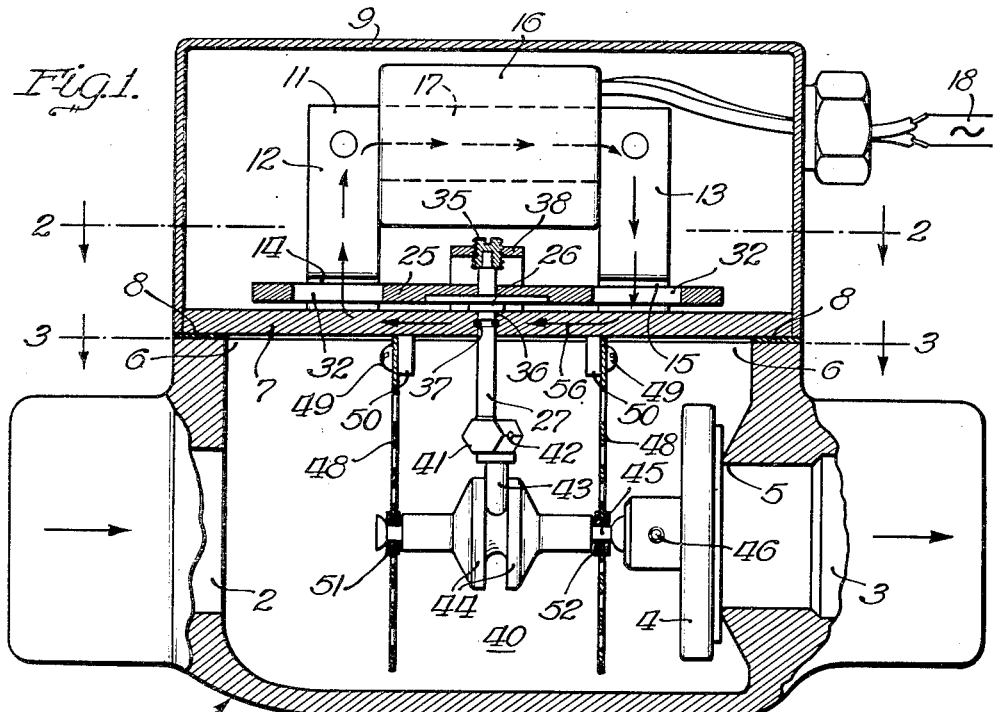
Figure 1 is an axial sectional view of one form of device embodying the present invention.

Referring now to the drawings, the embodiment of the invention illustrated in Figures 1 to 4, inclusive, comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid. It will be noted that the controlled fluid tends to hold the valve member 4 closed. This may, of course, vary within the scope of the present invention.

The valve body 1 has an opening 6 covered by a base plate 7. The base plate 7 may be secured in place, for example, by screws (not shown) screwed into the valve body 1. Sealing means 8 is preferably interposed between the base plate 7 and valve body 1 to render the connection gastight. A cover 9 for electromagnetic operator means to be hereinafter described may be secured in place, for example, to base plate 7 by screws (not shown) or otherwise as desired. The base plate 7 is preferably formed of steel or other suitable magnetic material and the cover 9 is preferably formed of suitable non-magnetic material.

Mounted, for example, on the base plate 7 is a power unit comprising a magnetic frame 11 of laminated or other suitable form. The magnetic frame 11 is preferably formed of silicon iron or other magnetic material. The particular frame 11 selected for illustration in Figure 1 is of inverted generally U-shaped configuration with the ends of the legs 12 and 13 thereof presented toward and spaced from the base plate 7 to provide a pair of coplanar air gaps 14 and 15 therebetween. A winding 16 is disposed on the leg 17 of the frame 11 which leg 17 magnetically connects the legs 12 and 13. The winding 16 is thus located to one side of the plane of the air gaps 14 and 15. The winding 16 is adapted to be connected to and energized from a suitable source of electrical energy as depicted by the symbol 18 in Figure 1.

The magnetic frame 11 may be supported on the base plate 7, for example, by a pair of angular brackets 20 having upright legs 21 between which the legs 12 and 13 of the magnetic frame 11 are positioned and secured, for example, by rivets (not shown). The legs 22 of the brackets 20 may be secured in place on the plate 7, for example, by rivets 23.

The rotary armature 25 is in the form of a flat stamping of copper or other suitable non-magnetic and good electrical conducting material and is non-rotatably connected at 26 to a shaft 27 to turn the shaft 27 about its axis by turning movement imparted to the armature. The axis of turning movement of shaft 27 and armature 25 is disposed generally parallel with the direction of spacing of the pole faces of the magnetic frame 11 from the base plate 7. The armature 25 has unitary or integrally formed diametrically opposite armature portions 28 and 29 which may be generally fan-shaped or enlarged sidewise as shown in Figure 2 and operate in the air gaps 14 and 15 to impart turning movement to the armature 25 and thereby to the shaft 27 in the direction of the arrow 30 (Figure 2) by magnetic flux produced across the air gaps 14 and 15 upon energization of the winding 16.

Figure 2:
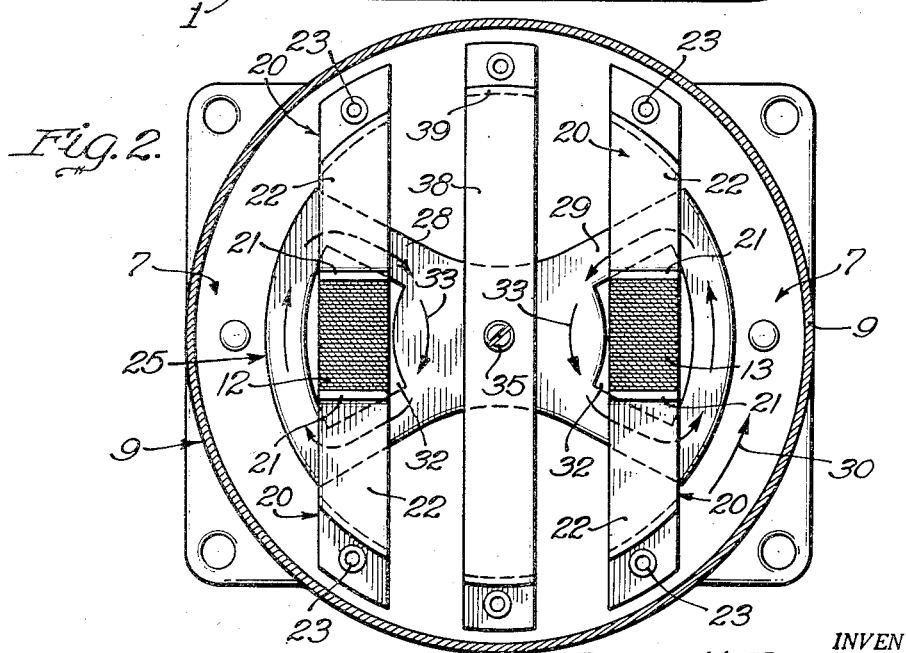
Figure 2 is a sectional view taken on the line 2—2 of Figure 1.

Each armature portion 28 and 29 is preferably provided with an opening or window 32 forming a current conducting path of closed looped form about each such window 32 for the flow of current in the directions indicated by the arrows 33 in Figure 2. This flow of induced current along the paths 33 produces a flux which reacts with the magnetic flux across the air gaps 14 and 15 to impart turning movement by repulsion to armature 25 and shaft 27 in the aforementioned direction. If desired, inserts (not shown) of iron, steel or other magnetic material may be located in the windows or openings 32 and thereby within the looped conducting paths 33 and in the air gaps 14 and 15 between the pole faces of the magnetic frame 11 and the magnetic base plate 7 to increase the power afforded by the operator.

The armature shaft 27 is mounted for turning movement, for example, at its upper end as shown in Figure 1 in a bearing insert or screw 35; also in the base plate 7 at 36. A resilient or rubber-like O-shaped ring 37 may be mounted in an annular groove in the plate 7 to cooperate with the shaft 27 to provide a gastight seal. The bearing insert 35 is screwed through and adjustably carried by a bracket 38 having downturned legs 39 which may be secured to the base plate 7 by screws, rivets, or other suitable means (not shown).

For purposes of illustration the shaft 27 is shown more or less schematically as extending downwardly into valve chamber 40 of valve body 1. The lower end of the shaft 27 may be connected, for example, non-rotatably but adjustably to one end of a crank member 41. As best shown in Figure 3, the crank member 41 may be non-rotatably connected to the shaft 27 as by a pin 42 for transmission of any turning movement of armature 25 to crank member 41. At the opposite end of the crank is a downwardly extending pin 43 off center with respect to the axis of rotation of shaft 27. The pin 43 is adapted to engage a yoke 44 (Figure 1) connected at one end as by a stem 45 and a pin 46 to valve member 4.

The aforementioned yoke-valve member assembly is preferably of the form illustrated and described in the copending application of Floyd J. Bydalek and Russell B. Matthews, Serial No. 270,666, filed February 8, 1952. The details of this assembly may be ascertained more fully by reference to the above mentioned copending application. Suffice it for purposes of the present application to state that the yoke-valve member assembly is preferably suspended in the valve body as by a pair of springs 48 attached as by screws 49 to the integral portions 50 of the base plate 7 which integral portions 50 extend inwardly through the opening 6 of the valve body. The springs 48 serve to support the valve member assembly in alignment with the valve seat 5 and may, if desired, serve also to bias both the armature 25 and valve member 4 as will presently appear. When the plate 7 carrying the power unit or electromagnetic operator is removed and/or replaced, the valve member assembly is removed and replaced therewith as a unit.

As shown in the aforementioned copending application, the springs 48 are preferably of flat spiral configuration in plan and conical helically in side elevation when uncompressed but numerous other configurations are contemplated. That is to say, when the turns are in a plane as shown in Figure 1, they are under compression and impart, for example, a sealing force to valve member 4 against its valve seat 5. Movement of the valve member 4 to open position against the bias of the springs 48 further compresses the latter. In this regard, while as above mentioned the ends of the outermost turns of the springs 48 are attached to plate 7 as herein described, the innermost turn of each spring is attached to the yoke assembly at 51 and 52.

The valve member 4 may be, in general, of the type more fully disclosed in the copending application of Carl Wolff, Serial No. 194,505, filed November 7, 1950, now Patent No. 2,687,501, but may, of course, be of other suitable form.

The operation of the embodiment of the invention illustrated in Figures 1–4 is as follows:

In unenergized condition the armature 25 is angularly disposed approximately in the solid line position shown in Figure 2. The valve member 4 may be in closed position at this time as shown in Figure 1 but it is to be understood that the valve may, of course, be normally open and operated to closed position by the magnetic operator. It is to be further understood that as previously set forth the electromagnetic operator may be used to operate an electric switch or any other similar or desired device.

It is to be further understood that the angular position of the shaft 27 and hence armature 25 and valve member 4 when the electromagnetic operator is energized is determined in the illustrated embodiment of the invention, for example, by the bias of the springs 48. In the illustrated embodiment of the invention, the sealing of the valve member 4 against the valve seat 5 under the spring bias limits rotation or turning movement of the armature 25 and provides a stop therefor in its unenergized state.

When the circuit of the coil or winding 16 is closed, the winding generates magnetic flux in the magnetic frame 11 which at one-half of the alternating current cycle flows in the direction of the arrows 56 in Figure 1, for example, down through the leg 13, across the adjacent air gap 15, through the magnetic base plate 7 and up through the other air gap 14 and the other leg 12 of the magnetic frame. The flux across the air gaps 14 and 15 induces electric current in the armature portions 28 and 29 which flows in the closed looped paths 33. This current produces a flux which reacts with the magnetic flux across the air gaps 14 and 15 and the reaction turns by repulsion the armature 25 in the direction indicated by the arrow 30 in Figure 2.

The generation of the maximum force when the armature 25 is in its full line position (Figure 2) and with the valve member 4 in closed position affords maximum torque or operating force at the start of the operator movement. It is this maximum initial force which as previously set forth is advantageous in overcoming the inertia and friction of the moving parts and in overcoming fluid pressures in "cracking" or opening a valve where the controlled fluid tends to hold the valve closed.

It is, of course, understood that rotation of the armature and consequent movement of the valve member 4 through the linkage of the shaft 27, crank member 41 and yoke 44 is against the bias of the springs 48 which return both the valve member 4 and the armature 25 to their initial position upon deenergization of the armature 25, for example, by deenergizing the winding 16.

In the embodiment of the invention illustrated in Figure 5, the parts like those shown in Figures 1–4 are designated by primed reference characters corresponding with the reference characters employed in Figures 1–4. In the embodiment of Figure 5, the magnetic frame 11' has an additional leg 60 magnetically connected thereto on which a secondary winding 61 is disposed. The primary winding 16' is adapted to be connected to a suitable source of electrical energy as depicted by the symbol 62 in Figure 5. The circuit of the secondary winding 61 may include condition responsive means such as a thermostat illustrated schematically at 63 in Figure 2. It will be understood that when the primary winding 16' is energized and the secondary open, the magnetic flux created in the magnetic frame 11' will tend to follow around the frame through the leg 60 upon which the secondary winding 61 is mounted as indicated by the arrows 64 in Figure 5 in preference to jumping the air gaps 14' and 15' between the magnetic frame 11' and the magnetic plate 7'. However, when the secondary circuit is closed, induced currents in the secondary winding 61 will divert the magnetic flux from the leg 60 and cause the flux to flow down through the leg 13' across the air gap 15' through the magnetic plate 7' and up through the air gap 14' and leg 12' to the leg 17' as indicated by the arrows 65 in Figure 5. This causes turning movement of the armature 25' with accompanying turning movement of the shaft 27' in the manner described in connection with the preceding embodiment of the invention.

With the transformer type operator shown in Figure 5, the transformer constitutes a current limiting step-down transformer wherein the electric energy produced in the secondary winding may be relatively low and substantially constant so that the secondary circuit and a thermostat or other condition responsive means therefor will not be deleteriously affected by the energizing current supplied to the primary winding and so that the type of insulating conduits required for line voltage conductors are unnecessary. This form of device is immune to short circuits on the secondary side of the transformer from the standpoint of damage due to overheating.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

We claim:

1. An electromagnetic operator comprising a magnetically permeable base plate, a magnetically permeable frame of inverted generally U-shaped configuration having legs, the ends of which afford magnetically permeable pole faces presented toward and spaced from said base plate to provide a pair of coplanar air gaps therebetween and at least one transverse portion magnetically connecting said legs, a winding on said frame which when energized is adapted to produce magnetic flux in said frame and across said air gaps and through said base plate, and an electrical conducting armature in the form of a flat stamping mounted for turning movement about an axis disposed generally parallel with the direction of spacing of said pole faces of said frame from said base plate, said armature having a pair of armature portions one operating in each of said air gaps, with each of said armature portions exposed to the adjacent pole faces of said frame on one side and to said base plate on the opposite side, each of said armature portions having an electric current induced therein by magnetic flux across said air gaps and the electric current induced in each of said armature portions producing a flux reacting directly with the flux across said air gaps to impart by the combined effect of said fluxes turning movement by repulsion of said armature about its axis.

2. An electromagnetic operator according to claim 1 wherein said armature portions have openings therein defining electric current conducting paths of closed circuit looped form.

3. An electromagnetic operator according to claim 1 wherein said base plate constitutes a cover for an opening in a valve body and said frame, winding and armature are carried by said base plate for application to and removal from the valve body with said base plate.

4. An electromagnetic operator comprising a magnetically permeable base plate, a magnetically permeable frame of inverted generally U-shaped configuration mounted on one side of said base plate and having legs, the ends of which afford magnetically permeable pole faces presented toward and spaced from said base plate to provide a pair of coplanar air gaps therebetween and at least one transverse portion magnetically connecting said legs, a winding on said frame which when energized is adapted to produce magnetic flux in said frame and across said air gaps and through said base plate, an electrical conducting armature in the form of a flat stamping connected to impart turning movement to a shaft about an axis disposed generally parallel to the direction of spacing of said pole faces of said frame from said base plate, said shaft projecting through and mounted for turning movement in said base plate, and an actuated device mounted on the opposite side of said base plate and operatively connected to said shaft for actuation by turning movement of said armature, said armature having a pair of armature portions, one operating in each of said air gaps with each of said armature portions exposed to the adjacent pole faces of said frame on one side and to said base plate on the opposite side, each said armature portions having electric current induced therein by magnetic flux across said air gaps and the electric current induced in each of said armature portions producing a flux reacting directly with the flux across said air gaps to impart by the combined effect of said fluxes turning movement by repulsion of said armature about the axis of said shaft.

5. An electromagnetic operator comprising magnetically permeable base plate, a magnetically permeable frame of inverted generally U-shaped configuration mounted on one side of said base plate and having legs the ends of which afford magnetically permeable pole faces presented toward and spaced from said base plate to provide a pair of coplanar air gaps therebetween and at least one transverse portion magnetically connecting said legs, a winding on said frame which when energized is adapted to produce magnetic flux in said frame and across said air gaps and through said base plate, an electrical conducting armature in the form of a flat stamping connected to impart turning movement to a shaft about an axis disposed generally parallel with the direction of spacing of said pole faces of said frame from said base plate, said shaft projecting through and mounted for turning movement in said base plate, an actuated device mounted on the opposite side of said base plate and operatively connected to said shaft for actuation by turning movement of said shaft, said armature having a pair of armature portions one operating in each of said air gaps with each of said armature portions exposed to the adjacent pole faces of said frame on one side and to said base plate on the opposite side, each of said armature portions having electric current induced therein by magnetic flux across said air gaps and the electric current induced in each of said armature portions producing a flux reacting directly with the flux across said air gaps to impart by the combined effect of said fluxes turning movement by repulsion of said armature about the axis of said shaft, and bracket means secured to said one side of said base plate and carrying on said one side of said base plate a bearing for the adjacent end of said shaft.

6. An electromagnetic operator comprising a magnetically permeable base plate, a magnetically permeable frame of inverted generally U-shaped configuration mounted on one side of said base plate and having legs the ends of which afford magnetically permeable pole faces presented toward and spaced from said base plate to provide a pair of coplanar air gaps therebetween and at least one transverse portion magnetically connecting said legs, a winding on said frame which when energized is adapted to produce magnetic flux in said frame and across said air gaps and through said base plate, an electrical conducting armature in the form of a flat stamping connected to impart turning movement to a shaft about an axis disposed generally parallel with the direction of spacing of said pole faces of said frame from said base plate, said shaft projecting through and mounted for turning movement in said base plate, an actuated device mounted on the opposite side of said base plate and operatively connected to said shaft for actuation by turning movement of said shaft, said armature having a pair of armature portions one operating in each of said air gaps with each of said armature portions exposed to the adjacent pole faces of said frame on one side and to said base plate on the opposite side, each of said armature portions having electric current induced therein by magnetic flux across said air gaps and the electric current induced in each of said armature portions producing a flux reacting directly with the flux across said air gaps to impart by the combined effect of said fluxes turning movement of said armature about the axis of said shaft, and bracket means secured to said one side of said base plate and supporting said frame on said one side of said base plate.

7. An electromagnetic operator comprising a magnetically permeable base plate, a magnetically permeable frame of inverted generally U-shaped configuration mounted on one side of said base plate and having legs the ends of which afford magnetically permeable pole faces presented toward and spaced from said base plate to provide a pair of coplanar air gaps therebetween and at least one transverse portion magnetically connecting said legs, a winding on said frame which when energized is adapted to produce magnetic flux in said frame and across said air gaps and through said base plate, an electrical conducting armature in the form of a flat stamping connected to impart turning movement to a shaft about an axis disposed generally parallel with the direction of spacing of said pole faces of said frame from said base plate, said shaft projecting through and mounted for turning movement in said base plate, an actuated device mounted on the opposite side of said base plate and operatively connected to said shaft for actuation by turning movement of said shaft, said armature having a pair of armature portions one operating in each of said air gaps with each of said armature portions exposed to the adjacent pole faces of said frame on one side and to said base plate on the opposite side, each of said armature portions having electric current induced therein by magnetic flux across said air gaps and the electric current induced in each of said armature portions producing a flux reacting directly with the flux across said air gaps to impart by the combined effect of said fluxes turning movement of said armature about the axis of said shaft, and bracket means secured to said one side of said base plate and supporting on one side of said base plate said frame and a bearing for the adjacent end of said shaft.

8. An electromagnetic operator comprising a magnetically permeable plate, a magnetically permeable frame having legs and at least one portion magnetically connecting said legs, the ends of said legs affording magnetically permeable pole faces presented toward and spaced from said plate to provide a pair of substantially coplanar air gaps therebetween, a winding on said frame which when energized is adapted to produce magnetic flux in said frame and across said air gaps and through said plate, and an electrical conducting armature in the form of a substantially flat stamping mounted for turning movement about an axis disposed generally parallel with the direction of spacing of said pole faces from said plate, said armature having two armature portions one operating in each of said air gaps, with each of said armature portions exposed to the adjacent pole faces of said frame on one side and to said plate on the opposite side, each of said armature portions having an electric current induced therein by magnetic flux across said air gaps, the electric current induced in each of said armature portions producing a flux reacting directly with the flux across said air gaps to impart by the combined effect of said fluxes turning movement by repulsion of said armature about its axis.

References Cited in the file of this patent

UNITED STATES PATENTS

| | | |
|---|---|---|
| 390,802 | Patten | Oct. 9, 1888 |
| 428,650 | Thomson | May 27, 1890 |
| 1,693,135 | Cardwell | Nov. 27, 1928 |
| 1,767,058 | Eiseman | June 24, 1930 |
| 1,979,127 | Warrick | Oct. 30, 1934 |
| 2,334,584 | Rich | Nov. 16, 1943 |

FOREIGN PATENTS

| | | |
|---|---|---|
| 584,543 | Great Britain | Jan. 16, 1947 |